(12) United States Patent
Guo et al.

(10) Patent No.: US 7,391,421 B2
(45) Date of Patent: Jun. 24, 2008

(54) CONVERSATIONAL INTERFACE AGENT

(75) Inventors: Baining Guo, Bellevue, WA (US); Bo Zhang, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/196,893

(22) Filed: Aug. 4, 2005

(65) Prior Publication Data

US 2005/0270293 A1 Dec. 8, 2005

Related U.S. Application Data

(63) Continuation of application No. 10/099,673, filed on Mar. 14, 2002, now Pat. No. 7,019,749.

(60) Provisional application No. 60/344,184, filed on Dec. 28, 2001.

(51) Int. Cl.
*G06T 15/00* (2006.01)

(52) U.S. Cl. .................... 345/473; 345/474; 345/475; 704/231

(58) Field of Classification Search .......... 345/473–475; 704/231, 235, 260, 280
See application file for complete search history.

(56) References Cited

U.S. PATENT DOCUMENTS

| | | | |
|---|---|---|---|
| 6,044,347 A | 3/2000 | Abella et al. | 704/272 |
| 6,097,381 A | 8/2000 | Scott et al. | 715/500.1 |
| 6,246,981 B1 | 6/2001 | Papineni et al. | 704/235 |
| 6,505,162 B1 | 1/2003 | Wang et al. | 704/275 |
| 6,539,354 B1 | 3/2003 | Sutton et al. | 704/260 |
| 6,657,628 B1 | 12/2003 | Cook | 345/473 |
| 6,731,307 B1 | 5/2004 | Strubbe et al. | 715/727 |
| 7,019,749 B2 * | 3/2006 | Guo et al. | 345/473 |

OTHER PUBLICATIONS

James Q. Jacobs, "I'm not a Crook," The Public Face and Private Political Reality of Richard M. Nixon, Jun. 2001, Internet: www.jqjacobs.net/anthro/discourse.html.
Microsoft Press, Microsoft Computer Dictionary, May 2002, Microsoft Press, Fifth Edition.
Lundeberg, M. and Beskow, J. Developing a 3D-agent for the August dialogue system. In Proc. AVSP'99, Santa Cruz, USA, 1999.
Oh, A. H. and Rudnicky, A. Stochastic language generation for spoken dialogue systems. ANLP/NAACL 2000 Workshop on Conversational Systems, 27-32, May 2000.
Paek, T. and Horvitz, E. Conversation as action under uncertainty. In Proc. 16th Conf. on Uncertainty in Artificial Intelligence (UAI-2000), Stanford, CA, Jun. 2000.
Pandzic, I., Ostermann, J. and Millen, D. User evaluation: synthetic talking faces for interactive services. The Visual Computer, 15:330-340, 1999.

(Continued)

*Primary Examiner*—Phu K Nguyen
(74) *Attorney, Agent, or Firm*—Westman, Champlin & Kelly, P.A.

(57) ABSTRACT

A video rewrite technique for rendering a talking head or agent completely simulates a conversation by including a waiting or listening state. Smooth transitions are provided to and from a talking state.

7 Claims, 5 Drawing Sheets

OTHER PUBLICATIONS

Peckham, J. A new generation of spoken dialogue systems: results and lessons from the Sundial project. In Proc. Eurospeech'93, 33-40, 1993.

Riccardi, G. and Gorin, A.L. Stochastic language adaptation over time and state in a natural spoken dialog system. IEEE Trans. on Speech and Audio, 8:3-10, Jan. 2000.

Rudnicky, A., Thayer, E., Constantinides, P., Tchou, C., Shern, R., Lenzo, K., Xu W., and Oh, A. Creating natural dialogs in the Carnegie Mellon Communicator system. In Proc. Eurospeech'99, 1531-1534, 1999.

Rudnicky, A. and Xu, W. An agenda-based dialog management architecture for spoken language systems. IEEE Automatic Speech Recognition and Understanding Workshop, 1999.

Schodl, A. and Szeliski, R. Video textures. In Proc. SIGGRAPH'99, 1999.

Wang, Y. A robust parser for spoken language understanding. In Proc. Eurospeech'99, 1999.

Ward, W. and Pellom, B. The CU Communicator system. IEEE Workshop on Automatic Speech Recognition and Understanding, Keystone, CO, Dec. 1999.

Zue, V. et al. Jupiter: A telephone-based conversational interface for weather information. IEEE Transactions on Speech and Audio Processing, 8(1), Jan. 2000.

N. Badler and S. Platt. Animating facial expressions. In Computer Graphics, pp. 245-252.Siggraph, Aug. 1981.

T.Beier and S.Neely. Feature-based image metamorphosis. In Computer Graphics, pp. 35-42.Siggraph, Jul. 1992.

M. Brand.V oice puppetry. In Computer Graphics, Annual Conference Series, pp. 22-28.Siggraph, Aug. 1999.

Beymer, D. and Poggio, T. Image representation for visual learning. Science, 272(28):1905-1909, Jun. 1996.

Bichsel, M. Automatic interpolation and recognition of face by morphing. In Proc. 2nd Intl. Conf. on Automatic Face and Gesture Recognition. Los Alamitos, CA, 128-135, 1996.

Black, M.J. and Yacoob, Y. Tracking and recognizing rigid and non-rigid facial motion using local parametric models of image motion. In Proc. IEEE Intl. Conf. Computer Vision, Cambridge, MA, 374-381, 1995.

Bregler, C., Covell, M. and Slaney, M. Video rewrite: Driving visual speech with audio. In Proc. SIGGRAPH'97, 353-360, Jul. 1997.

Cassell, J. More than just another pretty face: Embodied conversational interface agents. Communications of the ACM 43(4): 70-78, 2000.

Cossatto, E. and Graf, H. P. Photo-realistic talking-heads from image samples. IEEE Trans. on Multimedia, 2(3), Sep. 2000.

Dahlbäck, N. Towards a dialogue taxonomy. In Proceedings of ECAI'96 Workshop Dialogue Processing in Spoken Language Systems, 28-34, 1996.

Escher, M. and Magnenat-Thalmann, N. Automatic 3D cloning and real-time animation of a human face. In Proc. Computer Animation, 58-66, 1997.

Ferguson, G. and Allen, J. TRIPS: An Integrated Intelligent Problem-Solving Assistant. In Proceedings of the Fifteenth National Conference on Artificial Intelligence (AAAI-98), Madison, WI, 567-573, Jul. 1998.

Ferguson, G., Allen, J., Miller, B. and Ringger, E. The design and implementation of the TRAINS-96 system: a prototype mixed-initiative planning assistant. TRAINS Technical Note 96-5, Computer Science Dept., University of Rochester, Oct. 1996.

Flycht-Eriksson, A. A survey of knowledge sources in dialogue systems. In Proceedings of IJCAI-99 Workshop on Knowledge and Reasoning in Practical Dialogue Systems, Stockholm, 1999.

Glass, J. et al. The MIT ATIS System: Dec. 1994 Progress Report. In Proc. ARPA Spoken Language Systems TechnologyWorkshop, Jan. 1995.

Guiard-Marigny, T., Adjoudani, A. and Benoit, C. A 3-D model of the lips for Realistic speech Amination. In Proc. Computer Animation '96, IEEE, 80-89, 1996.

Lee, Y., Terzopoulos, D. and Waters, K. Realistic modeling for facial animation. In Proc. SIGGRAPH'95, 55-62, 1995.

Lewis, J. Automated lip-sync: Background and techniques. Journal of Visualization and Computer Animation, 2(4):118-122, 1991.

B. Choe and H. seok Ko. Analysis and synthesis of facial expression with hand-generated muscle actuation basis. In Proceedings of Computer Animation, 2001.

T.Ezzat, G.Geiger, and T. Poggio. Trainable video realistic speech animation. In Computer Graphics, Annual Conference Series, pp. 388-398.Siggraph, Aug. 2002.

B. Guenter, C. Grimm, D. Wood, H. Malvar, and F. Pighin. Making faces. In Computer Graphics, Annual Conference Series, pp. 55-66. Siggraph, Jul. 1998.

Y. Lee, D. Terzopoulos, and K. Waters. Realistic modeling for facial animation. In Computer Graphics, pp. 55-62.Siggraph, Aug. 1995.

S.Z. Li and L. Gu. Real-time multi-view face detection, tracking, pose estimation, alignment, and recognition. In IEEE Conf. on Computer Vision and Pattern Recognition Demo Summary, 2001.

P. Litwinowicz and L. Williams. Animating images with drawings In Computer Graphics, pp. 235-242. Siggraph, Aug. 1990.

Z. Liu, Y. Shan, and Z. Zhang. Expressive expression mapping with ratio images. In Computer Graphics, Annual Conference Series, pp. 271-276.Siggraph, Aug. 2001.

N. Magneneat-Thalmann, N.E. Primeau, and D. Thalmann. Abstract muscle actions procedures for human face animation. Visual Computer, 3(5):290-297, 1988.

K. Perlin and A. Goldberg. Improv: A system for scripting interactive actors in virtual worlds. In Computer Graphics, Annual Conference Series, pp. 205-216.Siggraph, Aug. 1996.

F. Pighin, J. Hecker, D. Lischinski, R. Szeliski, and D.H. Salesin. Synthesizing realistic facial expressions from photographs. In Computer Graphics, Annual Conference Series, pp. 75-84.Siggraph, Jul. 1998.

F. Pighin, R. Szeliski, and D.H. Salesin. Resynthesizing facial animation through 3d model-based tracking. In International Conference on Computer Vision (ICCV'99), 1999.

S.M. Seize and C.R. Dyer. View morphing. In Computer Graphics, pp. 21-30.Siggraph, Aug. 1996.

D. Terzopoulos and K. Waters. Physically-based facial modeling and animation. Journal of Visualization and Computer Animation, 1(4):73-80, Mar. 1990.

S. Toelg and T. Poggio. Towards an example based image compression architecture for videoconferencing. In MIT Technical Report No. 1494, 1994.

K. Waters. A muscle model for animating three dimensional facial expression. Computer Graphics, 22(4):17-24, 1987.

Williams, Performance-Driven Facial Animation, Computer Graphics, vol. 24, No. 4, pp. 235-242, Aug. 1990.

Noh et al., Expression Cloning, ACM SIGGRAPH 2001 Conference Proceedings, Aug. 12-17, 2001.

* cited by examiner

CONVERSATIONAL INTERFACE AGENT

CROSS-REFERENCE TO RELATED APPLICATION

This application is a continuation of and claims priority to U.S. patent application Ser. No. 10/099,673, filed Mar. 14, 2002, entitled "CONVERSATIONAL INTERFACE AGENT", which claims the benefit of U.S. Provisional Application Ser. No. 60/344,184, filed Dec. 28, 2001, and is entitled "CONVERSATIONAL INTERFACE AGENT".

BACKGROUND OF THE INVENTION

The present invention relates to methods and systems for obtaining information from a computer. More particularly, the present invention relates to an agent as a guide for providing information to the user.

Many computer-implemented applications often include some form of a computer-animated character to provide information and/or interact with the computer user to solicit or provide information. One particular form, herein referred as a "talking head", is becoming increasingly used in a variety of applications including video games and web-based customer services. Commonly, a talking head is a frontal view of a head, a neck and shoulders. In this manner, the talking head simulates a person that the computer user can interact with. In many instances, the talking head makes interaction with the computer more comfortable and entertaining.

Significant problems however exist with current implementations of talking heads. In many applications, the talking head or other form of agent is animated or cartoon-based, which although may be easier to implement does not simulate a conversation with a real person, and thereby, may take away from the quality of the presentation. Although video-based systems have also been implemented, which use stored frames of a real person and render the frames in a lip-syncing manner when voice audio is presented, a conversation with this form of talking head is not realized. In particular, in such applications the agent will move when audio is presented; however, during times when the computer is listening, or otherwise receiving input, the talking head is frozen.

There thus is an on-going need to improve rendering of a talking head in a computer application. A system and method that addresses one, several or all of the above-identified problems would be particularly advantageous.

SUMMARY OF THE INVENTION

A video rewrite technique for rendering a talking head or agent completely simulates a conversation by including a waiting or listening state. Smooth transitions are provided to and from a talking state.

In one embodiment, a speech synthesizer receives input from a user for speech synthesis and provides an audio output signal. A video rendering module receives information related to the audio output signal and renders a representation of a talking head having a talking state with mouth movements in accordance with the audio output signal and a waiting state with movements in accordance with listening.

Preferably, the video rendering module accesses a store having a sequence of frames of the talking head and continuously renders at least a portion of each of the frames in the sequence of frames. The continuously rendered frames correspond to a background image and can have mouth movements that are neutral. When the talking state is rendered, the video rendering module selectively adds a corresponding mouth position for the talking state to each of the frames in accordance with the audio output signal and in accordance with tracked movements of the talking head during the sequence of frames.

DETAILED DESCRIPTION OF ILLUSTRATIVE EMBODIMENT

Figure 1:
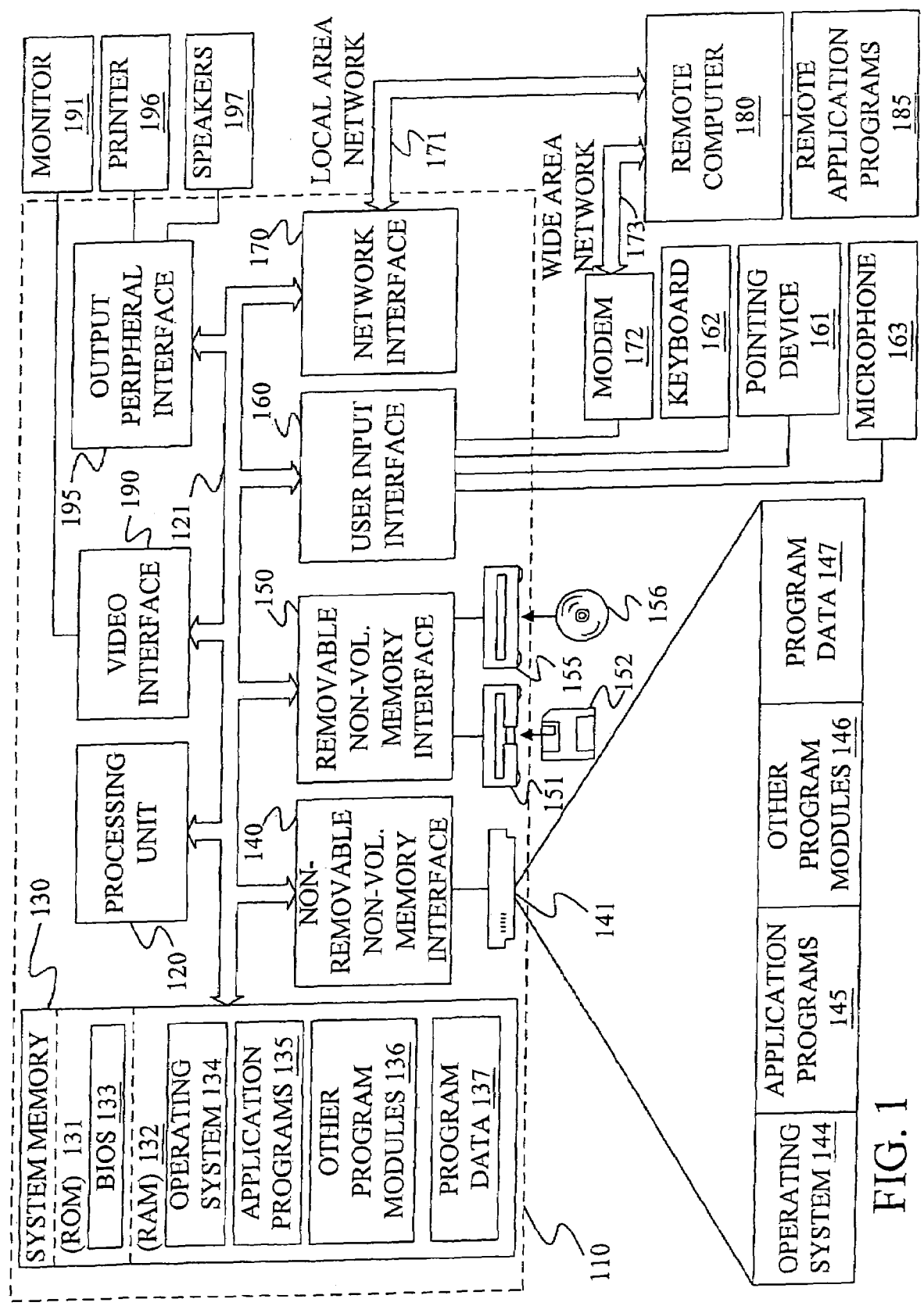
FIG. 1 is a general block diagram of a personal computing system in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
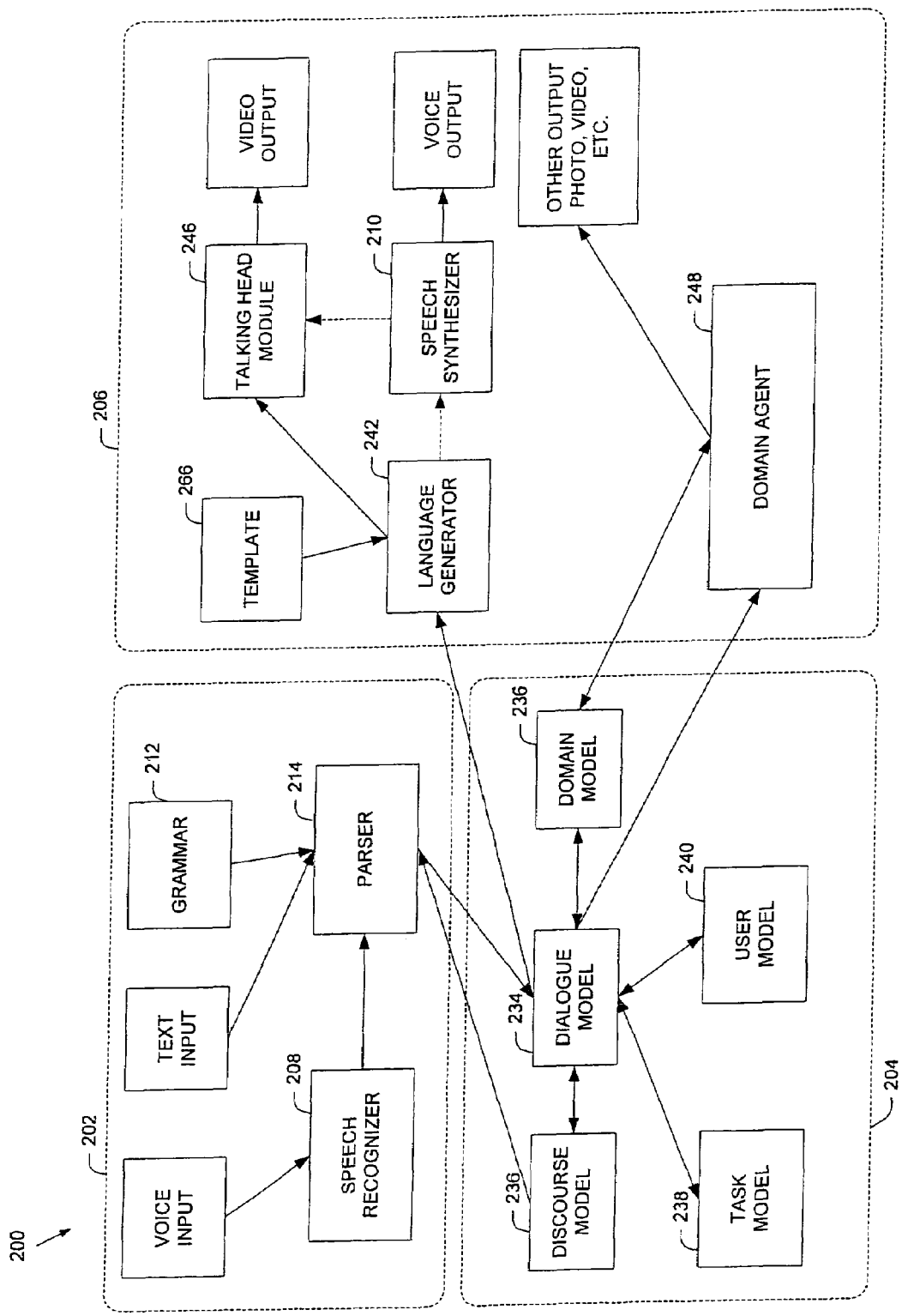
FIG. 2 is a block diagram of a dialog interface system.

FIG. 2 is a block diagram illustrating functional components of a system 200 incorporating aspects of the present invention. In one embodiment, the components of FIG. 2 are located within a personal computer system, such as the one illustrated in FIG. 1, although any of the computing environments described above can be used. In particular, the components can be distributed across the distributed computing environment and connected together through network connections and protocols. For example, the components could be distributed across an intranet or the Internet.

In FIG. 2, an interactive system 200 includes input devices or modules 202, a dialogue manager 204 and output devices or modules 206. Generally, a user can interact with the interface system 200 using input devices 202 to provide input to respond to queries from the system or to otherwise provide direction. The dialog manager module 204 analyzes the input from the user to access information relevant to a topic of interest. In particular, the dialog manager module 204 initiates or causes relevant information pertaining to the topic to be rendered to the user. Rendered information can include speech or voice audio, text, maps, charts, pictures or a video sequence to name a few.

A particularly useful embodiment of system 200 include a speech recognition engine 208 allowing the user to provide audio input in response to queries or to direct program flow. Likewise, in one embodiment, voice audio as rendered by the output device 206 with a speech synthesizer 210, and in one form, in conjunction with a talking head rendered on a suitable display can also be provided. In this manner, interaction with system 200 simulates a conversation between the user and the rendered image of the talking head. Specifically, the talking head will appear to wait or listen to the computer user in addition to appear to be talking to the user. This aspect is discussed below in greater detail. However, it should be noted that although described below with particular reference to speech input and audio/video output rendered in conjunction with a talking head, aspects of the present invention, such as operation of the dialog manager module 204 can also be realized with other forms of input and output. For instance, depending upon the information desired by the user, the dialog manager module 204 can operate over or through a telephone network, and thereby, provide substantially only audio output. Likewise, handwriting recognition or other forms of input can also be used as a means for providing input to the dialog manager module 204. Handwriting recognition and the modules that perform this task are well-known in the art.

A suitable speech recognition engine 208 is available from the Microsoft Speech SDK 5.0 from Microsoft Corporation of Redmond, Washington. In an exemplary embodiment, the speech recognition engine 208 provides two modes for speech recognition, a command and control mode and a dictation mode. In the command and control mode, the grammar is specified, for example, it can be provided as an XML file. In this mode, since the vocabulary size is small, recognition accuracy is relatively high. This mode of input generally accepts the user's major-commands like "begin", "pause", "end", "help", etc. However, since much of the input will fall outside of the grammar, the dictation mode of the speech recognition engine 208 is used to recognize the user's utterance in a conversation. In the exemplary embodiment, no grammar is required in this mode of operation.

Using the speech recognition engine 208 identified above, two methods are used to improve the recognition accuracy. The speech recognition engine 208 includes a number of exposed methods or APIs (application program interfaces). A first method of improving recognition accuracy includes calling an API with adaptation text to make the speech recognition engine 208 adapt to the text. The second method of improving recognition accuracy includes using a grammar 212 of a parser 214, discussed below, to guide the selection of the candidate word from the recognition results. The speech recognition engine 208 of the exemplary embodiment can also provide additional output information including the presence of a sound or phrase, recognition hypothesis, occurrence of events such as when the user speaks too fast, etc. This information can be useful in handling uncertainties at the speech recognition level, and thereby, can make the system more robust.

One particularly useful feature of the exemplary speech recognition engine 208 is to support user "barge-in". Barge-in occurs when the user attempts to interrupt the system 200 as voice audio is being provided. In many instances, the information provided to the user requires the system 200 to generate a long sentence as voice audio. Supporting user barge-in enables a more realistic conversation between the system 200 and the user, and can avoid unnecessary waiting. Nevertheless, in a noisy environment, misrecognizing a barge-in event could lead to many false interruptions. However, if the speech recognition engine 208 simply waits to ascertain whether the input sounds are of the user's voice, there could be a long period during which both the user and the system are speaking, which can give the user an uncomfortable feeling.

In an exemplary embodiment of the speech recognition engine 208, a sound start signal is provided through an API when sound is detected. At that point, various kinds of information can be used to calculate probability of whether the sound is the voice of the user. One of the more important types of information is a confidence level of the elements in the recognition hypothesis. Other information includes recognition error events (i.e., user speaks too fast), keyboard status and mouse status, etc. Based on this information, if the probability is high enough that the sound pertains to the user's voice, the system 200 will stop providing audio output and wait while the user is speaking. Otherwise the system 200 will ignore the apparent noise and continue providing audio output.

Parser 214 is included and provides a semantic context for the recognized result. In a spoken dialog system, the parser 214 should be robust enough to process weakly structured, spontaneous spoken languages. Ungrammatical sentences disfluencies (i.e. repeated words, repairs or false starts) are typically so pervasive that traditional parsers and NLP (natural language processing) grammars may not work well. A suitable parser such as described in "A Robust Parser for Spoken Language Understanding", by Wang, Y., Proc. Eurospeach '99, 1999 can be used. Like other robust parsers, this parser can handle many ill-formed sentences and is also capable of partial parsing. In particular, the parser can find the segment of interest within an ill-formed sentence that cannot be understood normally.

Parser 214 is part of a LEAP (Language Enabled Applications) architecture. System 200 uses a LEAP entity to represent an element of the real world that an application has to deal with and wishes to expose to the user via natural language. Parser 214 uses the LEAP grammar 212 to guide the parsing process. In the LEAP grammar 212, a semantic class specifies the LEAP entity. A LEAP entity defines a set of slots that need be filled with terminal (verbatim) words or with recursive semantic class objects. Each semantic class belongs to a certain type. In one embodiment, a pre-defined type "VOID" means a complete sentence.

Grammar 212 consists of semantic classes, productions and ( )-groups which contains rules. A rule contains one or more terms. A term is a list of factors. A factor is either a word, a meta word (e.g. "WILDCARD" means any words), a <...> or a ( )-group. A factor can be regular or weak (post fixed with a ?), which is something that adds little to the score whether it is matched or not. An example of a LEAP grammar is provided below:

---

LEAP Grammar Example:

@AskFor => can you| would you please?;
<VOID>ShowPic {
=>@AskFor? show me? the? (picture|photo) of
the?<Place>;

-continued

LEAP Grammar Example:

```
}
<Place>Place{
    =>@ForbiddenCity;
    =>hall of?<Hall>|<Hall>hall;
    @ForbiddenCity =>forbidden city|gugong;
}
Example: Can you show me the picture of the
    Forbidden City?
Result:<VOID>ShowPic
    <Place>ForbiddenCity
```

The dialog manager module 204 receives a semantic representation from the parser 214 related to the users input, herein through speech recognizer 208 although, as discussed above, other forms of input such as handwriting recognition can also be used. Assuming a suitable semantic representation exists, the dialog manager module 204 determines what actions to take regarding presenting information, or if necessary, soliciting further information from the user until the semantic representation is complete. Compared with simple-service systems and plan assistant systems, system 200 differs in both the form of the information source and the manner in which information can be conveyed to the user. In a simple service system, the information source is usually in a similar form and stored in some well-structured database or databases. Similarly, in a plan assistant system, information can be stored in a knowledge base or bases. Typically, however, although all the information related to a particular topic is present in system 200, the text information itself is very complex. It cannot be formalized to store in a structured database or knowledge base.

It should also be noted that the task of system 200 is also generally different than simple-service systems or plan assistant systems. In particular, system 200 is designed to actively provide the user with different useful information about a particular topic, and in one embodiment, when a dialog does not exist with the user. In contrast, a simple-service system provides an answer for the user's current request, which is usually adequate. For example, a simple-service system that provides information about train schedules could provide the time of departure for a query on a specific train. The information from a plan assistant system is also different. In particular, a plan assistant system provides help to the user to accomplish tasks already known to the system.

In the embodiment illustrated, the dialog manager module 204 can include five different knowledge sources comprising a domain model 232, a dialog model 234, a discourse model 236, a task model 238 and a user model 240. Briefly, the domain model 232 contains the information to be sought by or conveyed to the user, while each of the other remaining models 234, 236, 238 and 240 relate to how information is presented. In particular, the dialog model 234 contains information to control a dialog with the user and decide what action to take in a certain situation. The discourse model 236 is used to ascertain the current state of the dialog and is used for dialog control and context sensitive interpretation. The task model 238 allows the system 200 to take the initiative in a high level, conveying or rendering information to the user actively. The user model 240 contains user preferences, which can be obtained from interaction between the system 200 and the user. Including user preferences during interaction can improve the quality of the simulated conversation, and thereby, improve user satisfaction with the system 200.

In operation, as indicated above, the dialog manager module 204 receives the semantic representation from the parser 218 and then decides what to do by rule matching, which can also take into account the user preferences present in user model 240. If the dialog manager module 204 does not receive enough information, it can prompt the user to give more information. If the user does not have a particular request, the dialog manager module 204 can take the initiative according to task scripts in the task model 238 and begin presentation of information. By combining rule matching with form filling and task execution, a two-layer mixed-initiative dialog system is provided. Since the dialog manager module 204 knows when and what information to provide it can initiate various output components as needed. Generally, verbal actions are sent to a language generator 242, which in conjunction with the speech synthesizer 210 provides a voice output. In a manner discussed below, the voice output can be synchronized with a rendering of a talking head provided by a talking head module 246. Non-verbal action (i.e. non-spoken), like rendering a picture, map or the like, is initiated by a domain agent 248.

Figure 3:
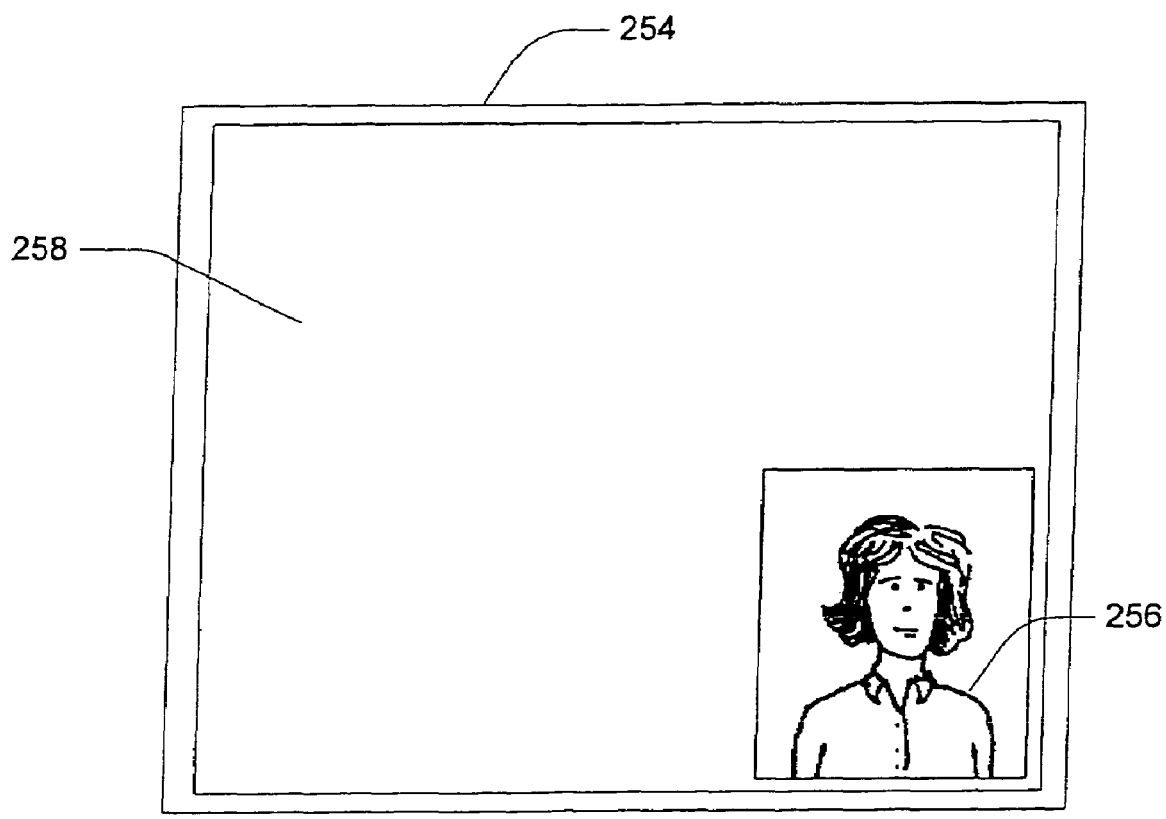
FIG. 3 is a front elevational view of a display.

FIG. 3 illustrates an exemplary display 254 having a talking head 256 for simulating a conversation. Typically, the talking head 256 is located in a portion of the display 254, thereby allowing the remaining portions to form a content window 258. In the following example, talking head 256 converses with the user about different places of the Forbidden City, and presents or renders multi-media material (images, videos, etc.) in the content window 258.

1. M> Hi, I'm Maggie, your tour guide. Welcome to the Forbidden City. First, . . .
2. U> Ok.
3. M>[Show Pic 1] Below is an introduction to the Forbidden City.
4. M> Also known as the Imperial Palace Museum or Gugong, the Forbidden City was the place . . .
5. U> I don't want to listen to this introduction part.
6. M> Ok. Do you want to go to the Gate of Meridian?
7. U> Yes, to that place.
8. M>[Show Pic 2] Welcome to the Gate of Meridian.
9. M> The Meridian Gate is the southern entrance of the . . .
10. U> Can you tell me the height of the Meridian Gate?
11. M> The height of the Gate of Meridian is 35.6 meters. Do you want to know why it got its name Meridian Gate?
12. U> Yes.
13. M> The Meridian Gate was named because . . .
14. M> We will leave the Gate of Meridian now. Do you want to go to the Gate of Supreme Harmony?
15. U> No, I want to go that hall.
16. M> Where do you want to go?
17. U>The hall of the middle harmony.
18. M>[Show Pic 3] Welcome to the Hall of Middle Harmony.
19. M> The Hall of Middle of Harmony originally built in 1420 and . . .
20. U> I want to leave this place.
21. M> Ok. Do you want to go to the Hall of Supreme Harmony?
22. U> No.
23. . . .

The above example illustrates some of the features of system 200. Specifically, if the talking head's sentence is too long for the user, the user can barge-in at any time (lines 1-2). The pictures are shown in the content window 258 (line 3). The system 200 has a tour plan for visiting different places within the forbidden city. However, the system 200 can adapt to the user and skip sites when being asked to (line 5-6). The system 200 can answer the user's question (lines 10-11). In addition, the system 200 can learn more about the user through these questions and take high-level initiatives at appropriate situations (line 11). The system 200 also has the ability of limited story-telling (line 13) and can take the low-level initiate for form-filling (line 16).

Referring back to FIG. 2, the dialog model 234 uses a combination of a dialog grammar and a frame-based approach. Generally, rules of the dialog grammar are used to construct a hierarchy of sub-dialogs. The dialog manager module 204 chooses the appropriate sub-dialog according to the discourse context (current dialog state) and the output of the parser 218 (user input including semantic information). Many different kinds of conversation can be provided by including appropriate sub-dialogs.

The example below shows an exemplary rule format and some specific examples.

```
Rule Definition:        <USER Condition> [AND [!] <CONTENT
                        Condition>] *=><Action>]*
Custom Condition Definition:    <CustomCondition>=>
                        <Action> [:<Action>]*
Custom Action Definition:   <Custom Action>=><Action>
    [:<Action>]*
Rules:      USER Ask AllObject Property=>SAY Reply
                AllObject Property
            USER YesAnswer AND CONTEXT
                Context#Context (AskGotoPlace)
                =>GET GotoPlace&Place: GOTO Place
                Place&Number: CUSTOM_COND Visit Number
Custom Conditions:      Visit Number (0) =>SET CurrentPlace
                        Place: SETPLACE Visit #Number (1):
                        CUSTOM ShowPic
                        Visit Number (1) =>CUSTOM Visited
Custom Actions:         SetSayPlace=>SET CurrentPlace
                        Place: SAY Tell Place
                        Visited=>CUSTOM SetSayPlace: SAY
                        Message #Message (Visited)
```

Each rule specifies a list of actions to be executed sequentially when a certain dialog state (represented by the CONTEXT CONDITION) and for a particular semantic information input by the user (represented by the USER condition). The action list can also include a branch structure by introducing a special action "Custom_Cond", which will select a different branch of the action list according to the value of a parameter.

The parameter of the CONTEXT condition is the context variable, which is part of the discourse model 236, which is used to represent the state of the dialog. It can be read in the condition part and written in the action part of a rule.

The frame-based approach is implemented by the USER condition, which generally is a form with many slots. The values of these slots are also part of the discourse model 236. If the dialog manager module 204 finds an unfilled slot, the dialog manager module 204 will repeatedly ask or prompt the user for the missing slots until all the missing slots are filled or the user gives up the current form, and thereby, takes the dialog in a different direction. Because the user can answer in any order he/she prefers, this can result in a low-level, mixed-initiative behavior of the system with the user. The focus of the parser 218 will be set to reflect the form-filling status. The result from the parser 218 that contains the value of a requested slot will be selected in high priority, and be filled into the particular slot. An example below illustrates form-filling with the "place" slot missing;

User input: I think it is the Gate of Meridian.
Parse tree: Request Place(Gate(Meridian)) Fill in the "Place" slot with Place (Gate (Meridian))

When the dialog manager module 204 requests content for a missing slot, the dialog manager module 204 can use a natural prompt specified by the designer if desired. Otherwise, a default prompt can be used when no specified one is present.

As indicated above, the discourse model 236 represents the current state of the dialog. Discourse models and modules that use the discourse model, herein dialog manager module 204, are generally known. In the present embodiment, two kinds of data structures are used to represent the dialog history. The first data structure includes data objects constructed recently, e.g. in the form of a list of filled or unfilled slots, while another list of context variables is also maintained. The context variables can be read and written in rules of the dialog model 234.

As indicated above, the domain model 232 holds the knowledge of the application that the system 200 will present. In other dialog systems, the domain model is often coupled with a background system like databases or knowledge bases. However, in the present system, the domain model 232 is typically not represented in such a well-structured way, because the domain model 232 includes, or makes references to, many kinds of information. Generally, the domain model 232 is hierarchically structured, for example, in a form of a tree, which provides the structured representation of many related concepts. For example, in the Forbidden City example provided above, a place tree with the Forbidden City at the top of the tree, and various places in the Forbidden City organized in a hierarchical manner with ever increasing detail can be provided. Each of the places in the tree can further include other facts related to the place. For instance, the height of various structures at a given place can be indicated, when the structures were built and what materials were used. It should be noted however that use of a place tree is but one exemplary embodiment and depending upon the information provided, the organizational structure of the trees can be oriented with respect to other concepts such as time, topics, components, people, to name a few.

It should be noted that the leap grammar 212 and language templates 266 can also be considered part of the domain model 232 although the dialog manager module 204 can not access this information directly.

System 200 actively provides the user with useful information related to a particular topic. Commonly, presentation of the information is not a simple one-shot task. Usually, presentation of the information will be composed of many sub-tasks or primitive actions. Some sub-tasks are fulfilled due to interaction with the user. As indicated in the example provided above, execution of a particular sub-task may be interrupted by the user when the user initiates a sub-dialog. In that event, the system 200 will begin again to continue on with its previous tasks after completion of the sub-dialog.

Typically, a task is a special action set. Referring to the example below, a script language is used to define the task structure of a particular application for the system 200.

```
Terminal task:     Introduction Place Number=>SAY Intro
                       Place Number
                   Story Place Number=>CUSTOM Story Place
                       Number
                   Summary Place=> SAY Summary Place:
                       SETPLACE Visit #Number(2)
Non-terminal task:
Place #Place (Gate (Meridian) )=>Intro Place #Num(2):
                       MoreInfo Place #Num(3):
                       Story Place #Number(1):
```

-continued

```
                Summary Place
Task associated with place:
            ForbiddenCity => Place
#Place (Forbidden City)
            Gate (Meridian) => Place
Place (Gate (Meridian) )
Task Trees:   Forbidden City (Meridian Gate, Gate of Supreme
              Harmony)
```

Generally, the actions are represented in task model 238 by a hierarchical task tree, where each node represents an action, while an internal node (non-terminal) represents a sub-task. Since there are many related concepts in the domain model 232, the tasks can be associated with different concepts of the domain model 232. If different concepts are switched, a switch is also made in the current task.

In one embodiment, to prevent a task from disturbing the user, the system 200 executes one of the tasks only when it is not engaged in any sub-dialog. The user can also direct the system to skip the current task or apparent task. But since the user may not be familiar with the actual task structure, the system 200 typically does not allow the user to jump between any nodes of the task tree; otherwise the user may be easily confused.

The domain agent 248 is a module that is responsible for the execution of domain-dependent non-verbal actions. In the example provided above, these actions include switching to different places in the Forbidden City, showing pictures of the Forbidden City, etc. The domain agent 248 obtains information from the domain model 232 and changes the domain model 232, which will affect the behavior of the dialog manager module 204.

The language generator 242 provides the text that will be converted to voice output through the speech synthesizer 210. In the embodiment illustrated, the language generator 242 accesses templates indicated at 266. Each template 266 consists of a name, parameters, and productions. Each production can have a parameter-value mapping list and one or more output sentences. In operation, when a verbal action is received from the dialog manager module 204, the language generator 242 looks-up the desired text output from the templates 266. The language generator 242 first matches the template name with the parameter name. The language generator 242 then compares the parameter-value mapping list with the production. (A wild card <STAR> can be used to represent any value.) If a matching production is found, one sentence will be chosen randomly from its output sentence list. In other words, the templates 266 store various forms of sentences that can be used to generally provide the same information. By having variance in the output sentences, a more natural conversation can be realized. The last step is to substitute the parameter in the sentence to generate the final output text. When using the text-to-speech for speech output, the system 200 can follow the user's style for presenting a concept if the phrase for that concept is extracted from the user's utterance. This technique can make the user feel more comfortable than hearing a different phrase for the same concept. In a first example provided below, the template provides the text for reciting the height of the Gate of Meridian.

Place(Gate(Meridian))Property(Height)=>The height
    of the Gate of Meridian is 35.6 meters.

The following template example illustrates different sentences that can be provided to convey that the height is not known.

Place (<STAR>) Property(Height)=>Sorry, I don't
    know the height of <STAR>.=>I don't think you
    can know the height of <STAR>.

In the following example, a general template is provided when a particular property of a given place is not known.

Place(<STAR:1>)Property(<STAR:2>)=>Sorry, I
    don't know the <STAR:2> of <STAR:1>

A particular advantage of using the template-based approach to generate responses is that templates 266 can be language specific, while the domain model 232 can be language independent. In other words, by separating the generation of verbal responses in the templates 266 from the domain model 232, a single domain model having all responses for every desired language need not be implemented, which reduces the developer's effort and the overall size of the system 200 when implemented on a computing device.

It should also be noted that the function of the language generator 242 can be embodied in the dialog manager module 204. Illustration of a separate module for the language generator 242 is provided to enhance understanding.

In one embodiment, text is transformed into speech and synchronized with the talking head 256 in real time. Depending upon the computing resources available, the talking head 256 can be generated offline according to particular sentences, which are prerecorded beforehand. In yet another embodiment, prerecorded phrases can be concatenated, which can be useful when used in conjunction with a template-based language generator 242.

As indicated above, user preferences can be stored in the user model 240. Generally, the user preferences are obtained by monitoring interaction of the user with system 200. For instance, if it appears that the user is in a hurry, some less important information can be skipped rather than be rendered. A parameter can be provided in the domain model 232 indicating significance or priority of the information. The dialog manager module 242 can ascertain if the user is in a hurry based on the number of interruptions or barge-in events that have occurred, or that have occurred over a selected time period. As the user makes more interruptions, the less important information is omitted. In another example, the user model 240 can include an indication as whether or not the user prefers short stories. If the user does not like short stories, the frequency of storytelling is reduced. The extent of whether or not the user likes short stories is based upon whether the user answers "no" when asked whether or not he wants to hear a story, or interrupts a story.

In yet a further example, the user model 240 can include an indication whether the user likes to ask questions. If the user likes to ask questions, the frequency of question requests is increased. Generally, a question request is a manner of saying something to the user to lead the user to ask a particular question that can be answered. Increasing the number of questions that can answered, increases user's satisfaction because the system 200 appears to provide a useful conversation.

As long as the dialog proceeds, the user's preferences will be changed dynamically. The dialog manager module 204 can adapt to this kind of change by storing the parameters of the user's preferences in the user model 240. Although the parameters are adjustable, the user's preferences typically are hand-coded in the rule system.

As indicated above, generation of the talking head 256 (FIG. 3) is provided by talking head module 256, which provides video output data indicated at block 270 that in turn is rendered by video display 254. Generally, the talking head module 256 implements a video rewrite technique wherein stored frames of video are sequenced selectively in order to provide facial and head movement animation. In one novel aspect, the frames are sequenced in order to completely simulate a conversation between the talking head 256 and the computer user. Although, video rewrite has previously been used for creating a talking head to speak individual sentences, the talking head 256 herein provided completes simulation of a conversation by continuing animation of the talking head between sentences, i.e. while the computer user is quiet, for instance, contemplating the next action, or when the computer user is speaking in order to simulate that the talking head 256 is listening. The talking head module 256 smoothly switches back and forth between waiting/listening and talking states of the talking head.

Figure 4:
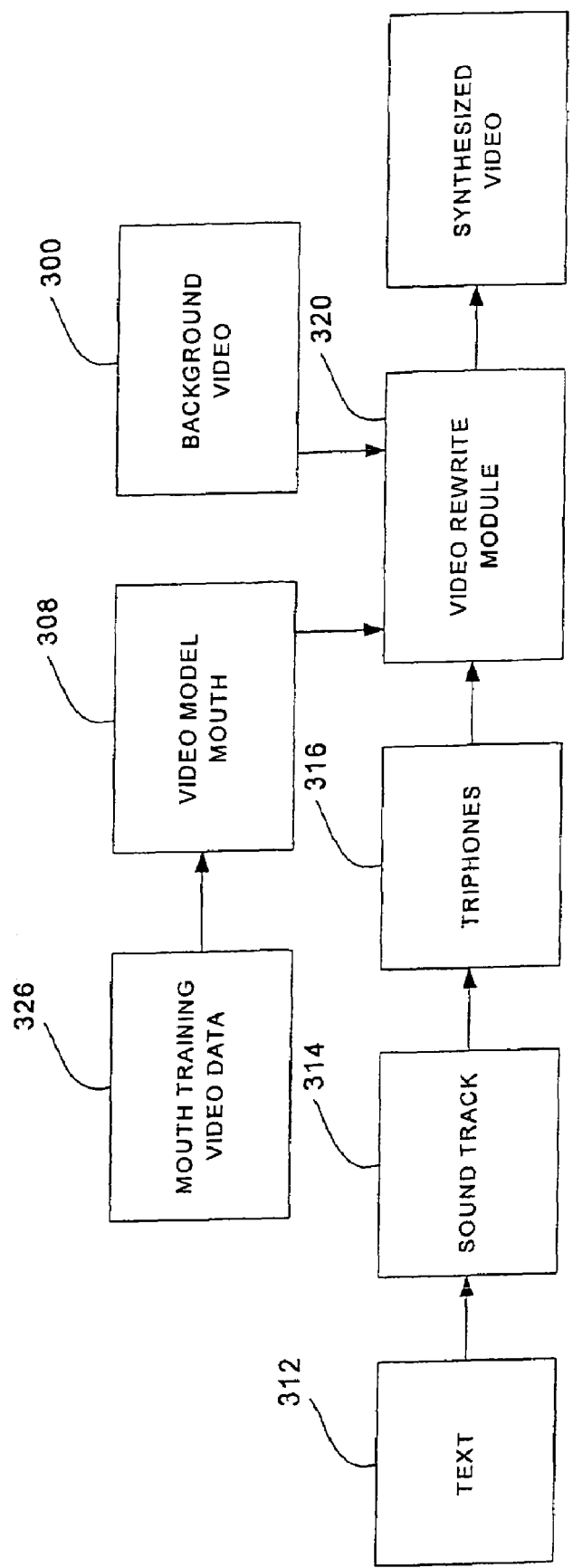
FIG. 4 is a block diagram of a video rewrite system.
Figure 5:
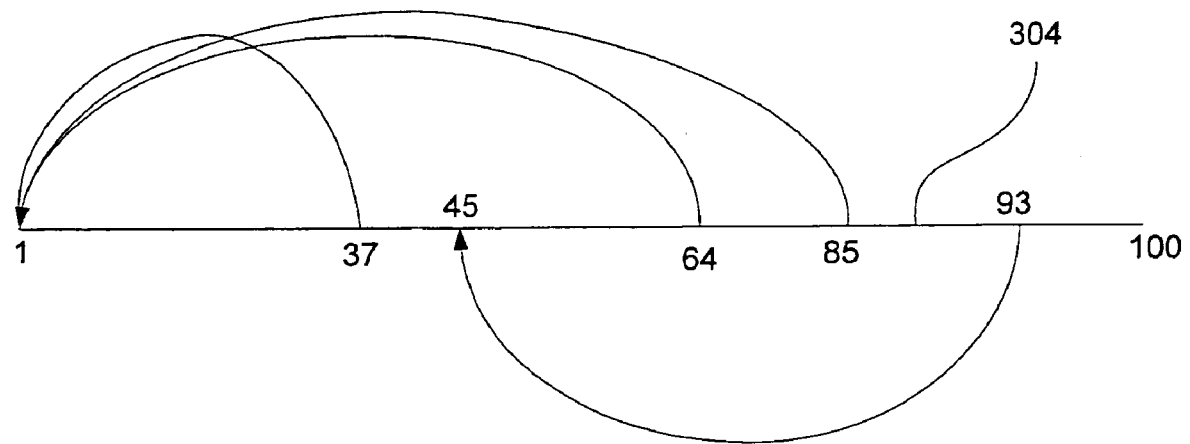
FIG. 5 is a graphical representation a video sequence.

Generally, facial animation of the talking head 256 is synthesized by video rewrite as a composition of two parts. As illustrated in FIG. 4, in a first part 300, a "background video" of the talking head's face, neck and shoulders are provided. Typically the background video 300 is obtained from a relatively short sequence of video frames. However, characteristics or features of the talking head 256 in the video frames are analyzed such that transitions can be formed between non-adjacent frames of the sequence. Referring to FIG. 5, line 304 represents 100 frames of continuous video of the talking head 256 with a neutral (i.e., non-talking) facial expressions. Using video texture, a continuous, infinitely long video sequence can then be obtained from a short video sequence by returning back to an earlier frame in the sequence whenever there is a smooth transition from the current frame to an earlier frame. In FIG. 5, possible transitions include (frame 37 to frame 1), (frame 64 to frame 1), (frame 85 to frame 1), and (frame 93 to frame 45). In one embodiment, the transitions are used randomly in order to avoid repetition. For instance, at each transition point, a transition probability can be ascertained as to whether to return back to an earlier frame or not. Video texture is generally known such as described in "Video Textures" by Schodl, A. et al., in Proc. SIGGRAPH'99, 1999. However, in the present embodiment, video texture provides the background video that continues infinitely without apparent repetition. And more importantly, continues in the waiting/listening state of the talking head in order to completely simulate a conversation between the user and the talking head 256.

A second part of the facial animation is obtained by superimposing upon the background video a video sequence of the jaw and mouth, which is lip-synced according to the spoken sentence or voice output. This component is illustrated in FIG. 4 at block 308. Sequences of frames for the jaw and mouth are stored with respect to a number of acoustical units (e.g. phoneme) such as a triphone. An audio output sentence to be spoken is received from the talking head module 256 from the speech synthesizer 210. In particular, as illustrated in FIG. 4, text 312 to be spoken is converted to a sound track or audio signal 314 by speech synthesizer 210. The audio output to be spoken is segmented into acoustic units such as triphones at 316. The shape distance between the triphone to be rendered visually and a labeled triphone in a video module 320 is computed and some of the smallest distances will be selected as candidates. The smallest path from the beginning triphone to the ending triphone is then determined and the selected triphone sequences will then be aligned with the voice output signal. The resulting triphone sequences of the mouth and jaw are then stitched into, or superimposed on the background video. It should be noted the video frame sequences or frames are stored in a database or store 326; however, each of the video frames are typically adjusted to a defined pose.

A challenging problem in using video rewrite for conversational interactions is facial pose tracking. Accurate facial pose tracking is useful for a smooth transitions between the talking and the waiting/listening states, as well as for allowing natural head motion of the talking head when it is in the talking state. To allow a variety of head motions, the talking head module 256 warps each face image into a standard reference pose. The talking head module 256 then attempts to ascertain the affine transform that minimizes the mean-squared error between face images and template images. The quality of facial animation largely depends on continuity of the facial pose. Even with a little error, the continuous mouth motion and the transition between talking and waiting/listening. states can become jerky.

Before describing techniques to improve facial pose tracking some background regarding appearance-based pose tracking may be helpful.

In appearance-based face pose tracking, the purpose of tracking is to compute the transformation between two images according some criteria. A transformation maps coordinate (x, y) in one image to (x', y') of another image. This transformation depends on the camera model.

A common model is the perspective model illustrated in FIG. 3 that is of the talking head 256. Defining that as the camera coordinate system, one point therein can be represented as (X, Y, Z), while in an image coordinate system it corresponds to (x, y) as follows:

$$x = f \cdot \frac{X}{Z}; y = f \cdot \frac{Y}{Z}$$

where f is the focus length, i.e. the distance between the two original points.

Some tracking error can be due to camera motion. Therefore, if camera has motion represented by rotation matrix R and the translation matrix T, which can be represented as follows:

$$\begin{bmatrix} X' \\ Y' \\ Z' \end{bmatrix} = R \begin{bmatrix} X \\ Y \\ Z \end{bmatrix} + T$$

$$R = \begin{bmatrix} 1 & -\Omega_Z & \Omega_Y \\ \Omega_Z & 1 & -\Omega_X \\ -\Omega_Y & \Omega_X & 1 \end{bmatrix}, T = \begin{bmatrix} T_X \\ T_Y \\ T_Z \end{bmatrix}$$

where $\Omega_X$: tilt $\Omega_Y$: pan $\Omega_Z$: z-rotation $T_X$: horizontal translation $T_y$ vertical translation $T_z$: z-translation, then the new coordinate is (let f=1):

$$x' = \frac{X'}{Z'} = \frac{X - \Omega_Z Y + \Omega_Y Z + T_X}{-\Omega_Y X + \Omega_X Y + Z + T_Z} = \frac{x - \Omega_Z y + \Omega_Y + T_X/Z}{-\Omega_Y x + \Omega_X y + 1 + T_Z/Z}$$

$$y' = \frac{Y'}{Z'} = \frac{\Omega_Z X + Y - \Omega_X Z + T_Y}{-\Omega_Y X + \Omega_X Y + Z + T_Z} = \frac{\Omega_Z x + y - \Omega_X + T_Y/Z}{-\Omega_Y x + \Omega_X y + 1 + T_Z/Z}$$

If all the points are in the same plane, then, $$aX + bY + cZ = \begin{bmatrix} a & b & c \end{bmatrix} \begin{bmatrix} X \\ Y \\ Z \end{bmatrix} = 1 \text{ or,}$$

$$\begin{bmatrix} X' \\ Y' \\ Z' \end{bmatrix} = R \begin{bmatrix} X \\ Y \\ Z \end{bmatrix} + T = R \begin{bmatrix} X \\ Y \\ Z \end{bmatrix} + \begin{bmatrix} a & b & c \end{bmatrix} T \begin{bmatrix} X \\ Y \\ Z \end{bmatrix} = A \begin{bmatrix} X \\ Y \\ Z \end{bmatrix}$$

where $A$ ($3 \times 3$) is, $$A = R + \begin{bmatrix} a & b & c \end{bmatrix} T = \begin{bmatrix} a_1 & a_2 & a_3 \\ a_4 & a_5 & a_6 \\ a_7 & a_8 & a_9 \end{bmatrix}$$

then $$x' = \frac{X'}{Z'} = \frac{a_1 X + a_2 Y + a_3 Z}{a_7 X + a_8 Y + a_9 Z} = \frac{a_1 x + a_2 y + a_3}{a_7 x + a_8 y + a_9}$$

$$y' = \frac{Y'}{Z'} = \frac{a_4 X + a_5 Y + a_6 Z}{a_7 X + a_8 Y + a_9 Z} = \frac{a_4 x + a_5 y + a_6}{a_7 x + a_8 y + a_9}$$

thus, there is no depth parameter Z, and the transformation is in fact up to scale. If $a_9$ equals 1, then the transformation can be described using 8 parameters. In the case of pure rotation of the camera, the same result occurs.

If a Projective condition is enforced by maintaining a parallel and fixed distance, then an affine model (6 parameters) is obtained. Affine can describe Pan, Tilt, Z-rotation and changing focus length, but theoretically not enough for plane perspective.

Model parameters can be estimated using a method based on feature correspondence or a direct method without feature correspondence. Referring first to the method based on feature correspondence and assuming corresponding points between two images, in an 8 parameter projective model, at least 4 pairs of corresponding points are needed. Each pair gives two equations:

$$\begin{bmatrix} x_k & y_k & 1 & 0 & 0 & 0 & -x_k x'_k & -y_k x'_k \\ 0 & 0 & 0 & x_k & y_k & 1 & -x_k y'_k & -y_k y'_k \end{bmatrix} \begin{bmatrix} a_1 \\ a_2 \\ a_3 \\ a_4 \\ a_5 \\ a_6 \\ a_7 \\ a_8 \end{bmatrix} = \begin{bmatrix} -x'_k \\ -y'_k \end{bmatrix}$$

If there are more than 4 pairs of corresponding points, a least squares method can be used. However, the main difficulties of a features based method of tracking include finding suitable feature points. In most cases, good feature points are selected by hand. Another difficulty is that this method is prone to noise.

The direct method is based on the assumption of constant:

$$I(x, y, t) = I(x+dx, y+dy, t+dt)$$

performing Taylor extension of the right side, and ignoring the higher order element, the optical flow equation can be obtained:

$$\frac{\partial I}{\partial x} \frac{dx}{dt} + \frac{\partial I}{\partial y} \frac{dy}{dt} + \frac{\partial I}{\partial t} = 0$$

It should be noted two types of the direct method exist. One is the optical flow method based on the optical flow equation above where an optical flow vector can be obtained from pixels in the image by optical flow method and then grouped, and finally the motion parameters of the model are obtained. But it is often difficult to obtain a reliable optical flow estimation. Another method uses a gray scale correlation method from $$I(x, y, t) = I(x+dx, y+dy, t+dt)$$

This method is computation expensive, but it does not need feature extraction and optical flow computing, and utilizes the information of the whole image.

Using the gray scale correlation method in the 8 parameter case, the coordinate of one pixel (x, y) in one frame becomes (x',y') in the next frame. A group of parameters ($a_1, a_2, \ldots, a_8$) is obtained to minimize the following function:

$$E \sum [I'(x'_i, y'_i) - I(x_i, y_i)]^2 = \sum_i e_i^2 \text{ where}$$

$$x'_i = \frac{a_1 x + a_2 y + a_3}{a_7 x + a_8 y + 1}, y'_i = \frac{a_4 x + a_5 y + a_6}{a_7 x + a_8 y + 1}$$

This is a non-linear optimization problem. However, it can be solved using the Levenberg-Marquard algorithm, which has faster convergence speed than using a common gradient method.

The derivative of $e_i$ is first computed for each one of the 8 parameters:

$$\frac{\partial e_i}{\partial a_1} = \frac{x_i}{a_7 x_i + a_8 y_i + 1} \frac{\partial I'}{\partial x'_i},$$

(and similar for $a_2, \ldots, a_6$)

$$\frac{\partial e_i}{\partial a_7} = \frac{x_i}{(a_7 x_i + a_8 y_i + 1)} \left( x'_i \frac{\partial I'}{\partial x'_i} + y'_i \frac{\partial I'}{\partial y'_i} \right),$$

(and similar for $a_8$) then computing the Hessian matrix H and the weighted gradient vector b, $$h_{kl} = \sum_i \frac{\partial e_i}{\partial a_k} \frac{\partial e_i}{\partial a_l}, b_k = -2 \sum_i e_i \frac{\partial e_i}{\partial a_k}$$

where an iterative method is applied to renew parameters in each iteration $$\Delta a = (A + \lambda I)^{-1} b$$

The process can be described as follows:
1. To each pixel($X_i, Y_i$),
   (1) Compute its coordinate in another image ($x_i', y_i'$)
   (2) Compute the gray scale error
   $e_i = I'(x_i', y_i') - I(x_i, y_i)$ and the gradient $$\left( \frac{\partial I'}{\partial x_i'}, \frac{\partial I'}{\partial y_i'} \right)$$

(3) Compute the derivative $$\frac{\partial e_i}{\partial a_k} = \frac{\partial I'}{\partial x_i'} \frac{\partial x_i'}{\partial a_k} + \frac{\partial I'}{\partial y_i'} \frac{\partial y_i'}{\partial a_k}$$

2. Compute Hessian matrix H and weighted gradient vector b
3. Solve the equation $(A+\lambda I)\Delta a = b$ for $\Delta a$, and update value of a by $a^{(t+1)} = a^{(t)} + a$
4. Check if the error E is decreasing -if not, change step length$\lambda$
5. Reiterate until error E is lower than a threshold or the maximum iteration number has been reached.

The above method can only converge to local minima. Thus a good initial value is needed to obtain a good result. Generally, it is assumed only small motions exist. If the motions are large, a pyramid can be constructed using the following method to obtain a good initial value.

Assume the source image I, define the pyramid of I as $P = \{P_0, P_1, \ldots P_N\}$, P is then constructed as the following: I is the 0 level, the first level is constructed by sampling from I. The whole image pyramid is then constructed. Obviously, motion parameters of $p_0$ is just that of the source image. The motion parameter is decreasing with the level increasing.

We can solve the motion parameters from the highest level with initial value 0. Because the parameters are small, in typical case much less than 1, we can solve more exactly. Then this value is used as the initial value of the next level. This initial value is near the real value.

We apply the pyramid as following method:

$$p_i(X, Y) = \sum_{m=0}^{1} \sum_{n=0}^{1} \frac{1}{4} p_{i-1}(2X + m, 2Y + n)$$

where $0 \leq X < W_i, 0 \leq Y < H_i$, $W_i$ and $H_i$ are the width and height of the i-th level image.

In the above, it is assumed the motion can be described by a group of parameters, and this parameter reflects the motion of camera. But in real video, there exists noise and the independent motion. In this case there are multi motion modals in the image. Because the motion caused by camera effects the greatest part of the image, it is called the dominate motion. The other motions, different from the dominate motions, are called outliers. The estimation of the dominate motion is not exact because of the outliers, and because the contribution of every pixel is the same in the objective function. Estimation is in fact based on the least squares method and is sensitive to outliers. A good result is typically obtained only when the data satisfies a normal distribution.

One way to avoid large area effects of outliers is to use a mask on the video frames. To deal with distributed outliers, a robust parameter M-estimation technique can be applied. It can be looked as a kind of weighted least squares method. Its advantage is simple and can be solved in a unified optimization frame.

A M-estimation problem can be described as the following: To a group of observed value $d = \{d_0, d_1, \ldots, d_s\}$, $s \in [0,S]$, using a model $u(s;a)$ to fit, the model parameters are $a = \{a_0, a_1, \ldots, a_n\}$, while the observed value may not satisfy normal distribution. The objective is to search for a group of parameters to minimize the objective function $$\min_a \sum_s \rho(d_s - u(s; a), \sigma_s)$$

where $\sigma_s$ is a scale. When the residue $e_s = d_s - u(s;a)$ satisfies a normal distribution, the optimized function $\rho$ is:

$$\rho(d_s - u(s;a), \sigma_s) = (d_s - u(s;a))^2 = e_s^2$$

This is in fact the ordinary least square form. If we choose different form of $\rho$, we have a different robust estimator.

The least square estimator is not suitable for parameter estimation in non-normal distribution, because the outlier is assigned a relatively large weight. We can know this from the influence function $\psi$ related to $\rho$. The influence function $\psi$ reflects the contribution of each observed value to the objective function. It is proportional to the derivative of $\rho$, $$\psi(e) = \frac{\rho'(e)}{2e},$$

in the least square case, the influence function is the same to all points.

$$\rho(x) = x^2 \; \psi(x) = 1$$

In order to obtain a robust function $\pi$, lower weights for outliers should be assigned. The simplest case is to let function $\psi$ be 0 for outliers. When the residue is less than a threshold, it is the same as the least square method; when the residue is larger than the threshold, it is constant.

$$\rho(x, \sigma) = \begin{cases} x^2 & \text{if } |x| < c \\ 0 & \text{otherwise} \end{cases}$$

$$\psi(x, \sigma) = \begin{cases} 1 & \text{if } |x| < c \\ 0 & \text{otherwise} \end{cases}$$

Applying Geman-McClure function, its $\psi$ will approach 0 when the residue is large, but the change rate is slower and smoother.

$$\rho(x, \sigma) = \frac{x^2}{\sigma^2 + x^2}$$

$$\psi(x, \sigma) = \frac{\sigma^2}{(\sigma^2 + x^2)^2}$$

In the realization of robust parameter estimation, there are two problems to be solved. First, the selection of scale $\sigma$, it determines when the residue value is large enough to classify to the outlier. In order to determine $\sigma$ automatically, an iterative method is used that decreases the value of $\sigma$ gradually, for example, $\sigma_{t+1} = 0.95 \, \sigma_t$.

Therefore, in the beginning, all points contribute to the objective function, then only those points whose residue are less than $\tau \sigma/\sqrt{3}$ contribute to the objective function. With the decreasing of $\sigma$, the influence of the outlier decreases gradually.

Second, the breakpoint of M-estimator is related to the number of parameters. Theoretically, it can tolerate $$\frac{1}{p+1}$$

outliers, where p is the parameter number. Obviously, the more complex of the model, the more parameters and the less robustness.

Techniques can be used to improve facial pose estimation. The first technique is to selectively use an estimated pose position based upon a pose of a preceding and a succeeding frame. If the actual pose position of the given frame exceeds a selected threshold from the interpolated pose position, it is assumed an abrupt change in position has occurred and therefore, the actual pose position will be used. If however, the difference between the actual pose position and the interpolated pose position is less than the selected threshold, the interpolated pose position will be used.

Linear interpolation directly on the affine parameters ($a_1$, $a_2$, $a_3$, $a_4$, $a_5$, and $a_6$) is not reasonable, because the parameters of the affine matrix do not correspond to physical motion. In the first aspect, the parameters of the affine matrix are decomposed according to the following:

$$\begin{bmatrix} a_1 & a_2 & a_3 \\ a_4 & a_5 & a_6 \\ 0 & 0 & 1 \end{bmatrix} = \begin{bmatrix} 1 & 0 & t_x \\ 0 & 1 & t_y \\ 0 & 0 & 1 \end{bmatrix} \cdot \begin{bmatrix} s_x & k & 0 \\ k & s_y & 0 \\ 0 & 0 & 1 \end{bmatrix} \cdot \begin{bmatrix} \cos\Theta & -\sin\Theta & 0 \\ \sin\Theta & \cos\Theta & 0 \\ 0 & 0 & 1 \end{bmatrix}$$

In this embodiment, the parameters of the affine matrix are decomposed into two translations $t_x$ and $t_y$, which correspond to horizontal displacement and vertical displacement of the talking head 256 on the display 254, respectively.

$\Theta$ is rotation of the x-y plane (for small displacements) about a z-axis extending mutually perpendicular to the x-axis and the y-axis. Parameters $s_x$ and $s_y$ relate to distortion of the facial image when viewed on the display 254 due to virtual rotation of the talking head 256 about the x-axis and the y-axis, respectively. Stated another way, the parameters $s_x$ and $s_y$ relate to distortion of the 3D image on a 2D-display for rotation of the 3D image about the x and y axes, respectively. The parameter K generally relates to distortion of the 3D image on a 2D-display caused by skewing its opposing sides in opposite directions around its center. In the decomposition indicated above, the first matrix provides translation parameters, the second matrix relates to distortion parameters and the third matrix relates to rotation of the x-y image.

In one embodiment, the parameters K and $\Theta$ are used to determine in a sequence of successive frames if the abrupt motion has occurred by the talking head 256. As indicated above, the parameters of the affine matrix are decomposed to the parameters indicated above for the pose of the preceding frame and the pose of the succeeding frame relative to the given frame. If the interpolated pose position based on these parameters exceeds a selected threshold, the actual pose parameters of the frame are used, whereas if the selected threshold is not exceeded, the interpolated pose parameters are used.

In a second technique, a second order prediction is used to determine the initial pose. In particular, for each physical parameter ($\Theta$, K, $s_x$, $s_y$, $t_x$, $t_y$) of frame n, the following equation is used.

$$\vec{p}(n) = \vec{p}(n-3) + 3(\vec{p}(n-1) - \vec{p}(n-2))$$

The physical parameters for frame p(n) is reconverted back to the affine parameters a (n). In particular, based on this initial value and the minimizing $E(I, T_{\vec{a}}(I))$ in order to solve for the affine parameters.

Although the present invention has been described with reference to particular embodiments, workers skilled in the art will recognize that changes may be made in form and detail without departing from the spirit and scope of the invention. In addition, although exemplified as a video agent for use as a tour guide, it should be understood that the present invention can be used with any type of video rewrite application such as but not limited to games, video based conferencing and the like.

What is claimed is:

1. A computer readable storage medium having instructions, which when executed on a computer provide a user interface, the instructions comprising:
   a speech synthesizer receiving input for synthesis and providing an audio output signal; and
   a video rendering module receiving information related to the audio output signal, the video rendering module rendering a representation of a head having a talking mouth portion with movements in accordance with the audio output signal, and wherein the video rendering module renders, as part of the representation a sequence of video frames having the head, and wherein the video rendering module selectively adds, to each frame, a mouth position for the mouth portion based in part on tracked movements of the head, wherein the video rendering module tracks movements of the head in the sequence of video frames, and wherein the tracked movements include translations and rotations of the head.

2. The computer readable medium of claim 1, wherein the positions of the mouth portion are added to each frame based upon interpolated physical movements of the head.

3. The computer readable medium of claim 1, wherein for each of a plurality of frames in the sequence, movements of the head are calculated as a function of a corresponding preceding frame and a corresponding succeeding frame.

4. A computer readable storage medium having instructions, which when executed on a computer provide a user interface, the instructions comprising:
   a speech synthesizer receiving input for synthesis and providing an audio output signal; and
   a video rendering module receiving information related to the audio output signal, the video rendering module rendering a representation of a head having a talking mouth portion with movements in accordance with the audio output signal, the video rendering module accessing a store having a sequence of frames of the head and rendering at least a portion of each of the frames in the sequence while selectively adding a corresponding mouth position based at least in part on tracked movements of the head, wherein the tracked movements of the head include translations and rotations.

5. The computer readable medium of claim 4 wherein the mouth positions are added based upon interpolated physical movements of the head.

6. The computer readable medium of claim 5 wherein for each of a plurality of frames, said interpolated physical movements are calculated as a function of a corresponding preceding frame and a corresponding succeeding frame.

7. A computer-implemented method for generating a talking head on a computer display to simulate a conversation, the method comprising:
- rendering a sequence of video frames of a head;
- tracking movements of the head throughout the sequence;
- selectively adding a corresponding mouth position to frames in the sequence as a function of the tracked movements of the head;
- wherein the tracked movements of the head include translations and rotations;
- wherein tracking comprises calculating interpolated physical movements of the head based on frames of the sequence; and
- wherein calculating interpolated physical movements includes calculating interpolated physical movements as a function of a corresponding preceding frame and a corresponding succeeding frame for each of a plurality of frames in the sequence.

* * * * *